3,427,946
SINGLE LENS REFLEX CAMERAS
Heinrich Broschke, Werner Holle, and Willi Wiessner, Wetzlar, Germany, assignors to Ernst Leitz G.m.b.H., Wetzlar, Germany, a corporation of Germany
Filed Oct. 5, 1966, Ser. No. 594,648
Claims priority, application Germany, July 6, 1966, L 51,782
U.S. Cl. 95—42       15 Claims
Int. Cl. G03b 19/12

The present invention relates to improvements for single lens reflex cameras with preview feature, exchangeable objective lenses and integrated light meter having a photoelectrical, light detecting element positioned in the camera and in the imaging ray path of a lens when mounted on the camera.

For photographic cameras with built-in light meters it is known to use a follow-up pointer as a reference which is coupled to the adjusting elements of the camera for exposure time and/or diaphragm. It is furthermore known to position the photoelectric element, such as a photocell or a photo resistor, directly into the light ray path of the camera's objective lens, so that the illuminating conditions can be measured for actually used diaphragm openings. The position of the indicator of the light meter is then compared with the follow-up pointer and further adjustments are derived from an evaluation of the relationships between the two pointers.

Single lens reflex cameras are usually now provided with the preview feature according to which the diaphragm is not adjusted directly, but there is provided a diaphragm selector ring which is adjusted in lieu of the normal, direct diaphragm adjustment, thus permitting view finding through the objective lens at fully open diaphragm. While the selector ring is adjusted, the diaphragm actually remains in the fully open position and upon releasing the shutter the diaphragm will close down to the selected diaphragm value but somewhat ahead of the actual shutter opening for taking of the exposure.

The light meter when positioned in the main imaging ray path of such a single lens reflex camera will not measure the light for the selected diaphragm value but only for fully open diaphragm conditions. Furthermore, for different objective lenses the measuring conditions are different to the extent of differing lens apertures at respective fully open diaphragms. Thus a correction is needed in order to show the user of the camera the light intensities he can expect when the diaphragm later on will actually close down from the respective maximum opening to the selected position.

The invention is directed towards a correcting system for the light meter in a camera, the photosensitive element thereof responding to the light intensity permitted to enter the camera through the lens. During normal light measurement the aperture of the lens will not be restricted by the diaphragm. As stated, the light meter provides an indication of the actual illuminating conditions in the camera but for fully open diaphragm. This indication is referenced against an adjustable indicator for the exposure time modifiable in dependence upon the particular film speed for proper coordination of the pertinent values.

As long as the diaphragm was adjusted directly the system was complete, as coordination of exposure time and diaphragm settings were possible by comparing the actual illumination conditions inside of the camera with the speed setting. However, the preview feature permits view finding at fully open diaphragm so that the light meter output is uncoordinated at that point with the selected diaphragm aperture to which the diaphragm will close down upon releasing the shutter, and the selected diaphragm value bears no visible relation to the speed setting.

In accordance with the invention, the relationship between light meter indicator and the referencing element is now additionally made dependent upon the relative diaphragm selection, down from the maximum aperture of the lens whatever the value thereof may be, and in particular and unique manner. The correcting control for this relationship between indicator and reference is a particular, constant value when the diaphragm aperture selection is the highest possible in the particular lens and thus agrees with the aperture of the lens at fully open diaphragm, independently from the actual value of that maximum aperture of the lens, so that this constant correcting control is the same for differing lenses when mounted to the camera and for maximum aperture selection conditions of each of them.

The correcting control for the light meter indicator-reference relationship is to some extent, including a coarse approximation, made dependent upon vignetting for diaphragm selections to about one or two f-stops down from maximum aperture selection for high powered lens. The correcting control is proportionate to the diaphragm aperture selection in the diaphragm aperture range down to the smallest aperture adjustable with the diaphragm, but for similar aperture selections in different lenses the correction control differs to the same extent that the light meter indication differs for maximum apertures of the different lenses.

The correction is thus directly proportionate to the change in light meter indication, to simulate the behavior of the light meter when the diaphragm would be changed over the same range as the selector is now actually being changed. The correction depends only on the relative change in diaphragm selection from the highest value down regardless of the absolute values and, excepting vignetting discussed below, the correction between reference and meter indicator is the same for each number of relative steps of f-stops down from the maximum value of the particular lens regardless to what diaphragm aperture selection this has actually led.

The correcting control is provided by a cam follower arrangement in which the follower or feeler for the cam provides for the adjustment of the relationship between the reference means and the light meter indicator. The principal aspect of the cam follower arrangement is the contour of the cam, which contour is similar for different objective lenses even when having differing apertures exhibited at maximum diaphragm opening. However, the contours are transformable and it is thus meaningful to speak of a contour. The cam follower cooperation over the entire range of a low or small aperture lens differs from the cam-follower cooperation of a high aperture lens in that the respectively produced follower paths differ by a fixed value, corresponding to the difference of apertures as actually effective in the input path of the light meter, and there is a cut-off point at a particular constant follower position which is to be common to all different lenses. The cut-off point for the contour on the cam of each particular lens at the said fixed follower position is always established when diaphragm selection agrees with the maximum lens aperture, or in other words when the selection agrees with actual conditions under which the meter measures. Whether the contour on the came for each lens has a cut-off private to the smallest diaphragm opening thereof is immaterial as further corrective values would have no meaning.

The feeler or follower thus provides a variable correcting control in between reference and indicator, which is constant (for example zero) when the selection agrees with the maximum aperture of the lens and varies from that constant value for closing down diaphragm selections corresponding to a variation in light meter indication if the diaphragm were actually closed down similarly from the maximum diaphragm opening. Preferably each lens among the plurality of exchangeable lenses will have its own cam and the contours of the several cams thus follow the above mentioned transformation rule. Alternatively there may be a single cam connectible or couplable to the different objective lenses, i.e., the diaphragm selector rings thereof, so that the transformation rule is fulfilled by the differing mode of coupling.

Vignetting of a high powered lens exhibits itself in the camera that for completely open diaphragm less than the theoretically expected light intensity reaches the photosensitive element in the interior of the camera. Thus the correcting control as between reference and light meter indication should be less than in case vignetting would not occur. This has a bearing on the association of the said contour to the individual diaphragm selection means.

Vignetting can be considered in a first order approximation in that the said constant correcting position of the follower is provided not just for the maximum aperture selection of the diaphragm for a lens but even for some smaller diaphragm aperature selection values as well. In this case the contour of all the cams defines a linear function of selected aperture values, and merges into the constant or fixed value (cut-off point) for the follower or cam feeler position for the maximum aperture selection of a lens having no or very little vignetting, but the same contour merges into that constant value for a diaphragm selection value somewhat less than maximum aperture selection value of a lens having strong vignetting. The linear relationship mentioned above is not mandatory but preferred as long as the light meter indicator moves by constant steps for each halving or doubling of the light intensity along the entire scale.

In a higher order approximation, the contour is curved at the end associated with large aperture selections. The transformation rule is applied so that the curved portion does not fall below the cut-off point for high powered lenses, but is cut off for low powered lenses so that the cam follower anticipates correctly the expected reduction in light intensity for any lens and to occur if the diaphragm is actually closed to the selector position, particularly now also in the range of large diaphragm openings.

It is furthermore suggested to provide for means placing the follower or feeler of the same cam follower arrangement into the said particular constant position when the contour does not control the follower, for example when an objective lens without the preview feature and/or without a cam, is attached to the camera. The resulting control is then constant and the same as for the maximum diaphragm aperture selection as aforedescribed.

If the camera is provided with a depth-of-field control according to which the selector ring is coupled to the diaphragm for direct adjustment of the latter upon manipulating the former, then the relation between light meter indicator and reference follows directly the change of the diaphragm setting. Thus, the cam follower must be made inoperative and the control exerted upon the indicator-reference relation is just the particular constant value. All relation control proceeds from there and is established when maximum aperture selection and maximum actual aperture concur. The control of the said relation proceeds always from that particular relation, either via the cam for constant maximum light influx, or via a variable light influx during depth-of-field control for a constant feeler output setting corresponding to the cam-feeler relation for maximum aperture selection.

In particular, the transmission between feeler and the indicator-reference relation control can be constructed as a two input linkage, one input being the feeler, the other input being operated by the depth-of-field control and being inactive as long as there is no depth-of-field control i.e., as long as selector and diaphrgam are decoupled. When the depth-of-field control is activated, the feeler is decoupled from the cam and the linkage provides an output corresponding to the said particular feeler position for maximum aperture selection.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
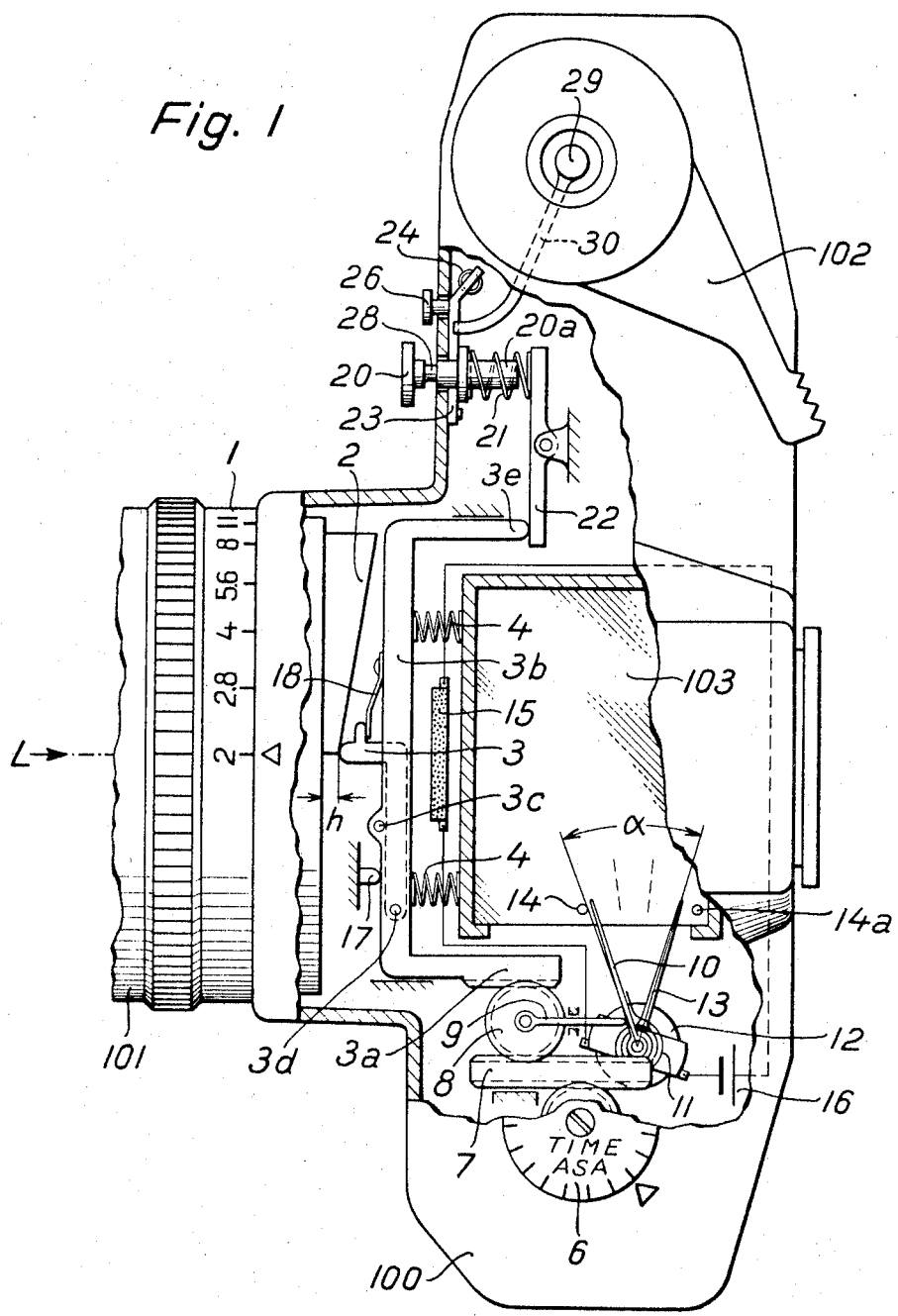
FIGURE 1 illustrates somewhat schematically a top view of a camera body with an objective lens, the top of the camera being partially removed to expose elements salient for practicing the present invention in accordance with the preferred embodiment.

Proceeding now to the detailed description of the drawings, in FIGURE 1 thereof there is shown an objective lens mount 101, mounted in turn to the housing or body 100 of a camera. The camera is illustrated mostly as to details pertinent to the invention. Among the conventional elements shown to facilitate orientation is the exposure time adjustment element 6, the shutter release button 29, film advance lever 102 and a mirror 103 which is positioned at a 45° angle to the optical axis of the lens in mount 101 and to be pivoted upwardly to open the path to the film positioned in the back of the housing and being vertically oriented, i.e., perpendicularly to the plane of the drawing of FIGURE 1. During initial camera adjustment, mirror 103 reflects the light pertaining to the imaging ray path of the objective lens in upward direction for use in a view finder (not shown).

Reference numeral 1 designates a diaphragm selector ring which is rotatably mounted in the lens mount 101. The ring 1 has a visible $f$-stop scale preferably linearly distributed along a portion of the circumference of ring 1. The scale is conventional corresponding to halving of the aperture selection for each setting step down. The ring is adjusted by aligning the stationary reference marker with a particular scale value. The reference marker is shown to be on the housing but may be on a stationary part of the lens mount. The ring 1 is provided with a correcting cam 2. The cam 2 is curved around the system axis which is usually the optical axis of the lens and about which the selector ring 1 can be rotated together with the cam. The contour of the operating surface of cam 2 is such that for progressing azimuthal angles with the optical axis as center the distance of points on the operating surface (contour) from an arbitrarily selected plane normal to the optical axis changes, for example increases, linearly.

A feeler arm or cam follower 3 engages with its tip the cam 2 and a spring 18 positively ensures this engagement. The L-shaped feeler arm 3 is mounted to a U-shaped lever 3b carrying the spring 18 and having a lug 3c to which abuts one arm of feeler 3. U-shaped lever 3b is biased by a pair of springs 4. The spring 18 must be much stiffer than springs 4 combined, so that a position change of feeler 3 does not result in a clockwise rotation of feeler 3 about a pivot pin 3d, but the position change is transmitted to lever 3b. For purposes of the aspect of the invention to be explained next, the levers 3 and 3b can be regarded as a single unit and could actually be structurally integrated to form a single lever. The separation is pertinent only for an improvement of the camera to be discussed later.

One leg of the U-shaped lever 3b is constituted by a rack gear 3a being one input element of a differential gear. The second input of the differential gear is provided by the adjusting knob 6, the relative position of which determines the shuter speed or exposure time at the given and also presettable film speed. Thees portions are shown only schematically as they are conventional. The knob 6 moves a second rack 7 and a pinion 8 is rotated by the two racks 3a and 7 in a differential manner whereby the center of the pinion 8 is moved perpendicularly to the axis of the pinion 8.

A pin 9 coupled to the pinion 8 is thereby moved, in the drawing, up and down. The lower tip of pin 9 engages a pointer 10 and transmits the output of the differential gear to this follower pointer which is biased by a spring 11 to ensure positive engagement of the pointer 10 with the tip of pin 9 over a given range of permissible angular deflection of the pointer 10. The pointer 10 is pivotally mounted in coaxial relationship to the principal operating axis of an electric measuring device 12.

The measuring device 12 has a pointer 13 which can pivot over a certain angular range defined by stationary stops 14 and 14a. The measuring device 12 is basically of the galvanometer type and is controlled by a voltage principally derived from a battery 16 which is connected in series with a photo resistor 15. This series circuit connection of elements 15 and 16 is connected across electric input terminals of the measuring device 12, and the voltage applied to these input terminals determines the angular deflection of the pointer 13. In this case it is presumed that the angular deflection is, for example, the angle α measured clockwise from the terminal position in which the pointer 13 abuts the stop 14.

In order to facilitate explaining the invention it is presumed that with increasing light the measuring device 12 causes the pointer 13 to increase its angle relative to the stop position at stop 14, so that the angle α increases with increasing light intensity as received by the photo resistor 15. It is further presumed, that the elements 12–15 together have a characteristic that pointer 13 is pivoted by a particular constant angle in one or the other direction if the light intensity reaching element 15 is doubled or halved.

The photo resistor 15 is suitably positioned in the light path of the objective lens of the camera. Since photo resistors are rather small, and since only a rectangularly shaped portion of the circular image as produced by the objective lens is used for photographic exposure on a film, there is sufficient place in the actual ray path but outside of the portion thereof actually used, for stimulating the small resistor 15. The resistor 15 thus monitors a fixed fraction of the total amount of light which can pass through the objective lens into the camera at any given time.

It is apparent that the diaphragm selector 1 does not influence the amount of light which can reach the photo resistor 15 prior to triggering, as normally only triggering of the camera shutter release 29 will cause the diaphragm to close to a preselected position. Manual depth-of-field control is a different situation discussed separately below.

It may now be assumed that, for example, the objective lens as shown in FIGURE 1 has a maximum diaphragm opening of $f:2$. Therefore this maximum diaphragm aperture determines during the regular view finding and measuring period the amount of light which can reach photo resistor 15. This will cause the measuring device 12 to provide a particular deflection of the pointer 13, and it is presently assumed that the angle α shown in FIGURE 1 represents for a given object field that illumination value.

Upon setting the knob 6, for a preselected film speed for the film loaded in the camera, the rack 7 has a particular position. The position of pointer 10 is additionally determined by the position of rack 3a. As long as the selector ring 1 is in a position that a diaphragm aperture of $f:2$ has been selected, and as long as this selection is not being changed, then the knob 6 alone will determine the position of pinion 8 and pin 9, which in turn determine the position of the pointer 10. It can thus be seen that for any ambient illuminating condition and for any time-film speed setting, there is a yet uncoordinated relation between meter indicator 13 and reference pointer 10. The two pointers 10 and 13 must register, so that at a given illumination as provided by the object field the correct combination of film speed, shutter speed and diaphragm opening is present.

One can see that for the condition as illustrated in FIGURE 1, one could establish such registering position of pointers 10 and 13 by operating, i.e., rotating the knob 6 until the pointer 10 registers with the pointer 13, and then for the preselected film speed the thereby adjusted shutter speed will give a correct exposure for the maximum diaphragm opening $f:2$. This mode of measuring is, of course, conventional. If now, in turn, for photographic reasons the shutter speed at the given film speed is to have a particular value, knob 6 will be so adjusted, and it will be necessary to move pointer 13 into registering position with the pointer 10. Thus it is necessary to close the diaphragm so that the light received by resistor 15 diminishes and measuring device 12 will pivot pointer 13 until registering with pointer 10.

It may now be assumed that for the adjusted shutter speed it is necessary to close the diaphragm down to $f:5.6$ in order to obtain correct exposure. It is clear that in case the camera is not provided with a diaphragm selector but only with an immediate or direct diaphragm setting ring, a closing of the diaphragm down to $f:5.6$ would reduce the light intensity reaching the photo resistor 15 accordingly, and the measuring device 12 would thereby cause the pointer 13 to be placed in the registering position in relation to the position of pointer 10. Disregarding for a moment the control cam 2, such a registering of pointers 10 and 13 does not occur when the diaphragm selector 1 is rotated to select $f:5.6$ because the adjustment of the selector ring has no influence whatever on the amount of light that can reach the photo resistor 15 prior to release of the shutter.

The curve 2 now provides for a controlled alignment of the two pointers 10 and 13 by operating the selector ring 1. The pointer 13 of course remains in the position it has, but upon rotating ring 1 to the selected position $f:5.6$ the cam 2 moves the feeler 3 axially out of the illustrated position, so that the rack 3a operates pinion 8 to push pin 9, in the drawing, down, while rack 7 remains stationary. Thus, the pointer 10 is again the one which is moved until registering with pointer 13. In practice, therefore, the user will always observe the movement of pointer 10 until it registers with the pointer 13 regardless of whether he adjusts shutter speed knob 6 or diaphragm selector 1; he thus manually controls always pointer 10 (except for depth-of-field control to be discussed later).

It will facilitate the understanding of the invention if one realizes that in the specific example given it may require three diaphragm adjusting steps or three exposure time steps in order to provide for the correct diaphragm-time correlation. For example, the user may change from the original setting $f:2$ through $f:2.8$ and $f:4$ to $f:5.6$. This relationship of course is true only for the given lens having a maximum aperture of $f:2$ as this particular aperture determines the position of the pointer 13 under the particular external illumination conditions. For this particular case the diaphragm adjustment requires the closing of the diaphragm (ultimately) for three $f$-stops down from maximum opening.

Figure 2:
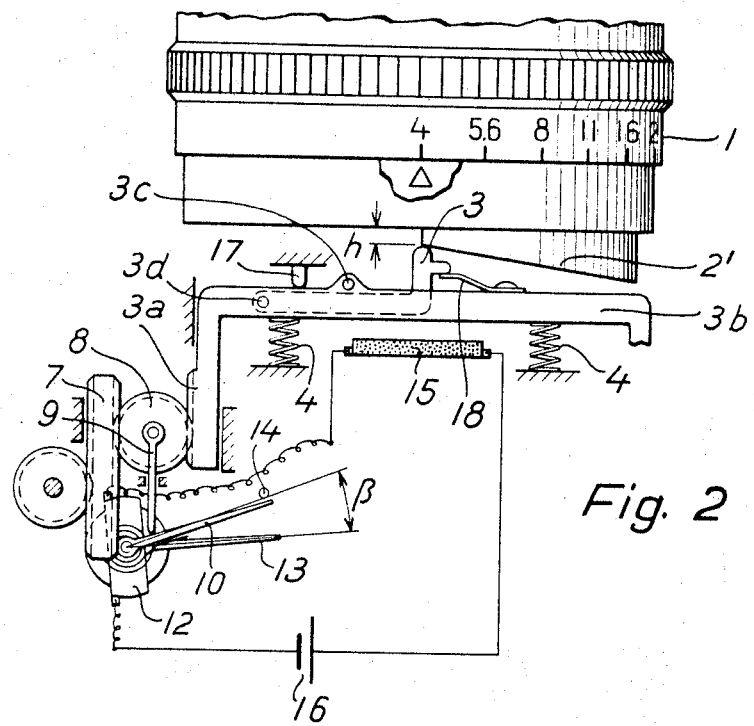
FIGURE 2 illustrates several of the elements also shown in FIGURE 1 but with an objective lens having an aperture differing from the objective lens shown in FIGURE 1.

It shall now be assumed that the user exchanges the lens with a maximum aperture $f:2$ for a lens having a maximum aperture of $f:4$; this is illustrated in FIGURE 2. For a completely open diaphragm a certain amount of light will again reach the photo resistor 15, but it will only be one-fourth of the light that reached the photo resistor 15 for a maximum diaphragm opening of $f:2$. Accordingly the pointer 13 has now an angle in relation to its terminal position at stop 14 which is designated with reference character $\beta$ and which is indicative of this lesser amount of light reaching the photo resistor 15. The angle value $$\frac{\alpha - \beta}{2}$$

corresponds to doubling or halving of the light intensity as received.

In this case, and again considering that the shutter speed and the film speed are preselected and the same as before, it will require a diaphragm selector adjustment by only one $f$-stop down in order to bring the two pointers 10 and 13 into alignment. For a selector position corresponding to a completely open diaphragm of this $f:4$ lens the feeler 3 has the same position as it had for a selector ring position in the $f:2$ lens for an $f:2$ aperture selection, and thus pointer 10 has also the same position. It follows, therefore, that the cam 2' for this lens with a maximum aperture of $f:4$ must differ from the cam 2 which pertains to $f:2$ lens. This difference is not a difference in overall configuration or in the slope of the contour of cam 2 for the two different diaphragm selectors but can be explained in this manner: The contour of the cam of a particular objective lens must be such that for maximum aperture opening as permitted by the particular lens regardless of the aperture value thereof lever 3b with ratchet 3a is in the same position, and the feeler 3 must thus be placed in the same position. From that position the feeler 3 must be moved by similar steps for each successive adjustment step of the diaphragm selector defined by a selection change of one $f$-stop.

If we call $\Delta h$ the adjustment increment for lever or feeler arm 3 corresponding to a change in selector setting by one $f$-stop, and if $\Delta \phi$ is the adjustment angle of selector ring 1 as between two succeeding $f$-stop positions, then the rule can be stated twofold. Any two contours for the cams pertaining to two different lenses can be transformed into each other by angularly shifting the contour of the cam of one selector ring by an angle of $nx\Delta\phi$ or by axially shifting the contour of the cam by $nx\Delta h$, so as to arrive at the contour value for the respective maximum aperture selection of either lens and with $n$ being the number of $f$-stops by which the maximum aperture of the one lens differs from the maximum aperture of the other lens. Each transformation can thus also be understood as a combination of axial and angular shifting of the contour.

This transformation can be understood mathematically abstract or physically direct. The rule for the transformation can be such that it determines the permanent mounting of a cam to a selector ring of an objective lens in relation to other cams of similar contour for other objective lenses. However, it is conceivable to have this cam provided as a separate part and the user mounts this cam (one single element) to the particular lens selected among a plurality of different lenses intended to be used.

With regard to any particular lens with selector ring, the cam associated therewith has a contour which may have, so to speak, an origin which defines the position of the feeler arm 3 for completely open diaphragm selection. It follows therefore, that the contour of cam 2' for the diaphragm selector ring 1' shown in FIGURE 2 must have the same relative position which the contour of cam 2 defined in FIGURE 1 has in relation to the respective maximum diaphragm aperture selection for either objective lens. Any adjustment of the respective diaphragm selector rings from the maximum diaphragm opening of the respective lenses thus begins from the same position for feeler arm 3. Pursuant to such an adjustment of the selector ring 1 or 1' the feeler 3 is shifted by the same value $\Delta h$ for each adjustment step and to the extent needed to produce alignment of the two pointers 10 and 13. By comparing FIGURE 1 with FIGURE 2, one can see that for the same external conditions pointer 10 will have to be adjusted by rotating ring 1 by three $f$-stops and ring 1' by one $f$-stop to produce alignment with pointer 13 for the same $f$-stop $f:5.6$ which is the correct setting for this case.

As furthermore shown in FIGURES 1 and 2 there is provided a stop 17 which arrests the lever 3b with rack 3a in the position corresponding to maximum aperture selection. This is of advantage in those cases in which one wants to measure the light intensity even if the objective lens with cam has been removed completely from the camera, or if an objective lens has been mounted to the camera which does not have such a cam 2. One can see that if the lenses of the size used in FIGURE 1 or FIGURE 2 do not have this cam 2 (2'), then the pointers 10 and 13 would still have the positions as illustrated, as stop 17 puts rack 3a into the same position. Any alignment between the two pointers would now be produced by direct diaphragm adjustment (or, of course, by changing the shutter speed).

As was already mentioned above, objectives with a high aperture and with a diaphragm opened for the highest aperture have, in general, natural and artificial vignettings. The overall effect thereof is a reduction of the light intensity actually passing through the objective lens into the camera in comparison with the theoretical value for the particular high aperture at fully open diaphragm. Therefore one distinguishes between a geometric aperture and a photometric aperture. The geometric aperture is the actual diaphragm opening which would permit passage of the theoretical, calculated light intensity, if the lens were free from vignetting. Upon adjustment of the diaphragm one usually establishes a geometric aperture. The photometric aperture is the effective diaphragm opening. The photometric aperture will differ from the actual opening as defined by a geometric aperture, due to vignetting. The distinction between photometric and geometric aperture or diaphragm opening is, of course, prevalent for lenses with large apertures, and has as a result that in this range the light intensity for the film does not change by the factor "two" per aperture step but by a lessor factor.

For example, a lens with a maximum aperture $f:2$ may have this highest aperture value only as a geometric aperture value, which means that the diaphragm laminates are constructed that upon changing the diaphragm from $f:2.8$ to $f:2$ the diaphragm area is doubled and the light intensity permitted to pass through the objective should be double. Due to vignetting, however, the light intensity is not doubled but increased by a lessor factor so that it appears as if the diaphragm was only opened, for example, to $f:2.3$. In this case then $f:2$ defines the geometric aperture but $f:2.3$ is the photometric aperture. No problem arises if the lens and the diaphragm is constructed so that the diaphragm actually opens to a geometric aperture higher than $f:2$ so that the highest $f$-stop on the selector scale actually selects a higher geometric value, while indicating $f:2$ as photometric aperture. Also, the light meter would then actually measure under photometric $f:2$ conditions. In this case the cam 2 of FIGURE 1 is fully correct, and the effect vignetting has does not falsify the measurement as the geometric maximum aperture may, for example, be $f:1.5$.

The situation is different, if the diaphragm setting follows strictly the geometric scale. It follows here that without further measures and considering the distinction between photometric and geometric aperture adjustment, an error would be introduced. For example, if the chosen objective lens has a maximum $f$-stop (geometric aperture) of $f:1.4$, and if for fully open diaphragm and by operation of the vignettings the photometric aperture is actually only $f:1.7$, then the measurement will be incorrect if one does not signal to the light meter arrangement that the measurement does not actually operate with a diaphragm opening of $f:1.4$ but only with a value of $f:1.7$.

Figure 3:
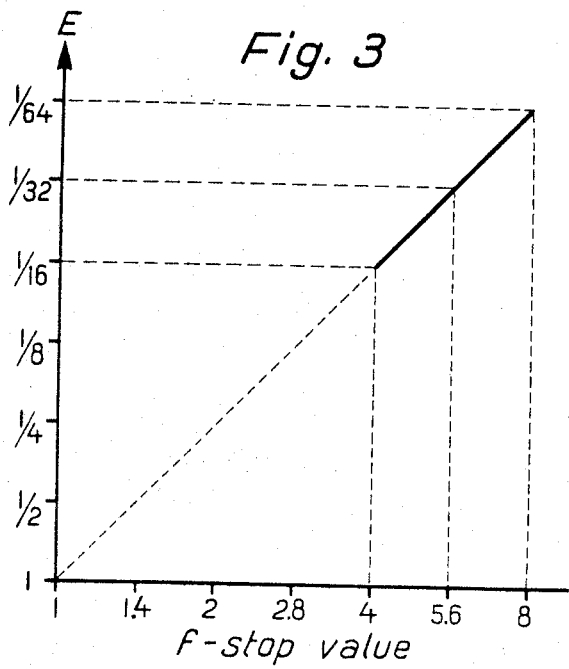
FIGURES 3 and 4 show diagrams in which for different objectives, diaphragm aperture values ($f$-stops) are plotted against the relative light intensity as modified by the diaphragm.
Figure 4:
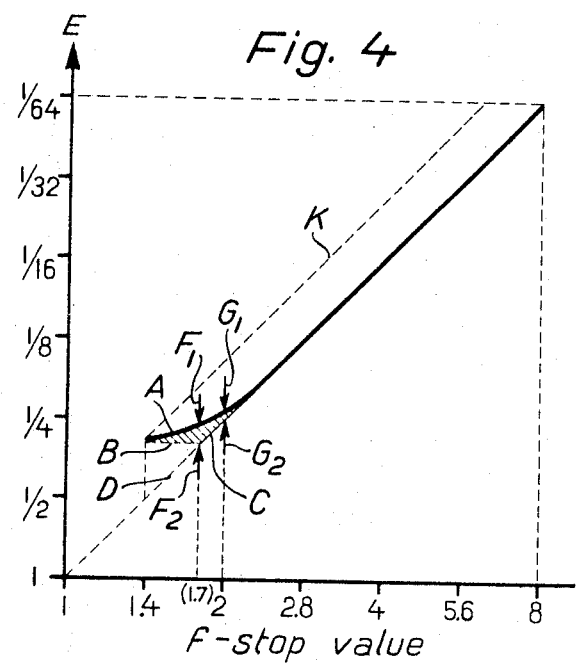

FIGURES 3 and 4 illustrate these relationships more fully. FIGURES 3 and 4 illustrate the relationships between light intensity E on a relative scale and actual diaphragm adjustments for two different objectives. FIGURE 3 illustrates particularly this characteristic for an objective lens with a maximum diaphragm opening of $f:4$. The characteristics, therefore, originates at an $f$-stop abscissa value of 4. For such an objective the vignetting has very little influence so that here photometric and geometric aperture stops agree. Thus, from $f:4$ down for each diaphragm closing step the light intensity is halved, as can be seen from the abscissa. The linear relationship between light intensity and diaphragm determines the relationship between diaphragm selector ring and correcting adjustment for pointer 10, which may conveniently be linearized, throughout the line of transmission from angular adjustment of the ring 1 to the resulting deflection of pointer 10.

The situation is different with regard to the characteristics shown in FIGURE 4. FIGURE 4 shows the light intensity versus aperture characteristics for a high powered lens with a maximum diaphragm opening of $f:1.4$, which is presumed to be a geometric aperture. In this case now one can see that the geometric and photometric apertures differ in the range from $f:1.4$ (geometric) to about $f:2.6$. The heavy curve including branch A shows the actual light intensities permitted to pass the lens for actual, geometric diaphragm aperture settings, while curve C can be interpreted as associating the same respective light intensities with different diaphragm values, thus refining corresponding photometric apertures. Curve C is in effect a linear extrapolation of that branch of the characteristics where photometric and geometric agree. For higher aperture stop values the characteristics follows again the same linear behavior as the curve shown in FIGURE 3.

Thus one can see from the lower portion of the curve plotted in FIGURE 4 that upon opening the diaphragm from $f:2$ to $f:1.4$ the light intensity is not doubled but increases by much less which is representative of the fact that due to vignetting the photometric aperture value differs from the geometric aperture value. In order to counteract this effect with regard to the adjustment of the feeler 3, two different measures are proposed. Of the two approaches, one can be regarded as a first order approximation, while the second one considers higher orders of accuracy.

Figure 5:
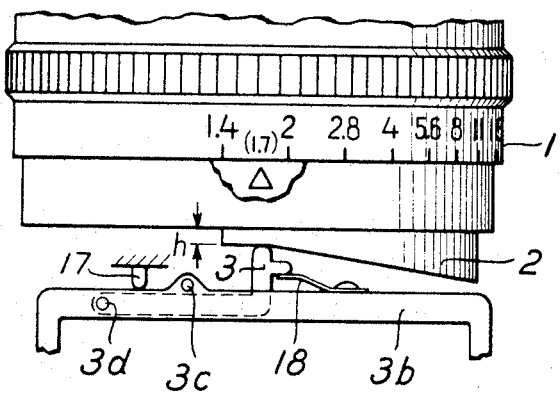
FIGURE 5 illustrates some of the elements shown in FIGURES 1 and 2 in cooperation with a cam associated with a selector ring of a high powered objective lens in a first order approximation for eliminating the effect vignetting has on the measurement.

The first one is shown in FIGURE 5 but does not correct completely the effect produced by the deviation of the photometric aperture from the geometric aperture. In FIGURE 5 it is assumed that the objective lens is one with a rather high maximum aperture such as $f:1.4$. When the diaphragm is actually adjusted for its maximum aperture, the light intensity actually reaching the photo resistor 15 will correspond only to an $f$-stop value of about $f:1.7$. Thus, upon adjusting the (geometric) diaphragm from $f:1.4$ to $f:2$ the light intensity is not halved but is only reduced as if a photometric diaphragm had been closed from an $f$-stop value of $f:1.7$ to $f:2$. Therefore, the correction to be introduced into the light meter system is less than the value $\Delta h$ which is the correction for lever 3 upon adjustment of the selector ring in between aperture values where photometric and geometric apertures agree.

The origin of the contour of cam 2 is not the geometric aperture value of $f:1.4$, but $f:1.7$; the inclination of the contour then proceeds from there at the same rate as for the other objective lenses. As a result and when selector ring 1 is adjusted from a maximum selection value $f:1.4$ to $f:1.7$, feeler 3 is not moved at all but is retained in the same terminal position. When the adjustment covers the range from $f:1.7$ to $f:2$, feeler 3 is moved but necessarily by less than $\Delta h$. The correction thus produced can be regarded as a first order approximation of the curved branch A of the characteristics shown in FIGURE 4 by the characteristics B–C. This, of course, is an improvement over the case if one would completely ignore vignetting. If one would position the cam so that the inclined portion begins right from set point 1.4, then the correction thus produced would be as if the light intensity changes along curve K for the several diaphragm setting, which would result in a material constant error.

Nevertheless this first order approximation of eliminating vignetting, produces a mismeasurement which is characterized by the hatched area in FIGURE 4. For example, if the selector ring 1 is closed down from $f:1.4$ to $f:1.7$, the cam 2 will impart no corrective value upon feeler 3, and pointer 10 will thus stay fixed. On the other hand, upon triggering shutter release, the diaphragm will actually close down to a geometric aperture of $f:1.7$, so that the light intensity is reduced to a value F1. That reduction was not anticipated by the correcting device of FIGURE 5.

If the selector ring is shifted to an $f:2$ selection feeler 3 produces a correction corresponding to point F2 in FIGURE 4 as anticipated light reduction, expected to result when the diaphragm closes to the selected value, namely, $f:2$. This correction is likewise not completely correct, as the light intensity would actually be reduced to G1 when the diaphragm actually closes down to $f:2$. Only when a selection of about $f:2.3$ and smaller apertures is made, then the correction introduced via feeler 3 to the light meter correctly anticipates the reduction in light intensity expected when the diaphragm closed to the selected value.

Figure 6:
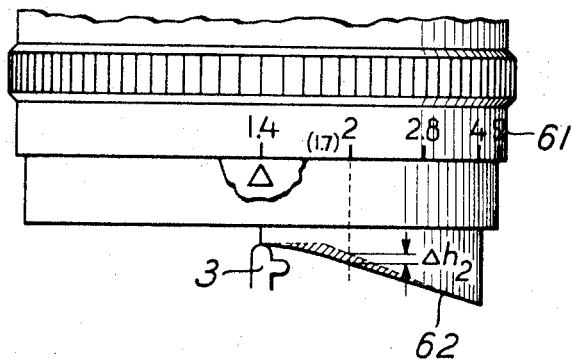
FIGURE 6 is an improved version of control elements shown in FIGURE 5 thus constituting a higher order approximation for correcting vignetting.

One can see, however, that the errors evidenced by deviation of F1 from F2 or G1 from G2 are rather small, and for simple cameras or when a film of rather high ASA number is used, the error may not be a disturbing one or even not be noticeable. For objectives and cameras intended to be operated under more critical conditions this first order approximation does not suffice, and higher order approximation is shown in FIGURE 6.

A diaphragm selector ring 61 here has a control cam 62 having for higher diaphragm openings a correcting contour to take the difference between photometric and geometric aperture fully into consideration. Unlike the cam in FIGURE 5, correction, i.e., feeler movement begins for any movement of the selector ring 61 out of the terminal position. As the feeler 3 runs over this contour of cam 62 it anticipates in every position of selector ring 61 the expected light reduction resulting after an actual closing of the diaphragm to the selected aperture value.

It follows, therefore, that for higher powered objectives the contour of the control-curve will differ from objective to objective in the range of higher apertures. This now is shown in particular by the contour 62 in FIGURE 6 and takes care of the difference between photometric and geometric aperture. However, this is not a deviation from the general rule regarding the transformability of the several contours for different objectives, as these curves can be mutually transformed in axial direction, with a cut-off for the corrective value common to all objectives independently from their respective maximum aperture. For low powered objectives the non-linear positions will then, so to speak, be transformed below the cut-off point. To elucidate this point more fully consider this: In relation to the $f$-stop selection scale, the contour of the cam $2'$ in FIGURE 2 can be transformed into the contours of the cams in FIGURE 1 or FIGURE 5 by a phase shift corresponding to an angular phase shift for as many angle-steps as the photometric, maximum apertures of the several lenses differ from each other. We defined above the angular scale-step in between two succeeding $f$-stops as $\phi$, and thus this phase shift is $n.\phi$ with $n$ now possibly being not an integer, because photometric maximum aperture areas of several lenses are not necessarily related by an integer as factor.

Since along the linear portions of all cams $\Delta h$ is the constant stroke of feeler 3 for any adjustment by selector 1 for angle $\phi$, it was also stated above that the contours of the several cams can be transformed into each other by an axial shift for $n.\Delta h$. That particular rule is now applicable also when the contour is as shown in FIGURE 6. An axial shift of the contour, as shown for a transformation to produce the particular cam contour for the $f:4$ lens, places the non-linear portion of that contour into a region above the particular value for maximum aperture selection. To state it differently, the non-linear portion of the contour is ineffective for an $f:4$ lens, as the non-linear portion is associated with the higher, i.e., larger apertures having no meaning for an $f:4$ lens, and thus in the several cams, after the transformation rule has been applied, contour portions outside of the particular diaphragm selector range of a particular lens are cut off.

A strictly axial shift for producing the desired particular transformation presupposes that vignetting be effective from a particular $f$-stop value, which is true only in narrow limits of differing maximum aperture values. Thus, in the general case there will be a particular combination of axial and angular shift of the contour to arrive at the cam contour for one type of lens from the cam contour of another type of lens. It follows that the different rules of contour transformation to arrive at the particular cam contour for any particular lens are applicable individually to the extent vignetting is to be considered.

Figure 7:
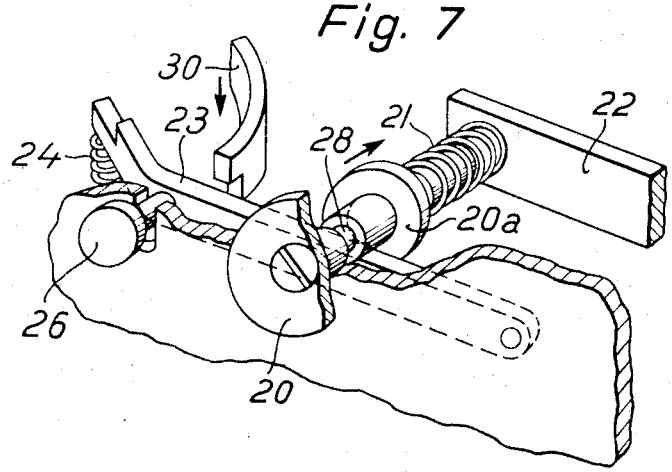
FIGURE 7 illustrates in perspective view a portion of the camera shown in FIGURE 1 including particular elements pertinent to a depth-of-field control.

We return now to FIGURE 1 and consider in addition FIGURE 7. In particular it shall now be considered that the feeler 3 and the lever $3a-3b$ may pivot relative to each other about the pivot point $3d$. For this we consider the fact that the camera may be provided, in addition, with a depth-of-field control button 20 which when pressed by the user closes the diaphragm to the setting of the selector ring. Thereafter, the diaphragm can be adjusted directly by rotating the selector ring. Of course, without this button 20 or without operating the button 20, the diaphragm closes to the adjusted value only upon shutter release triggering.

Figure 8:
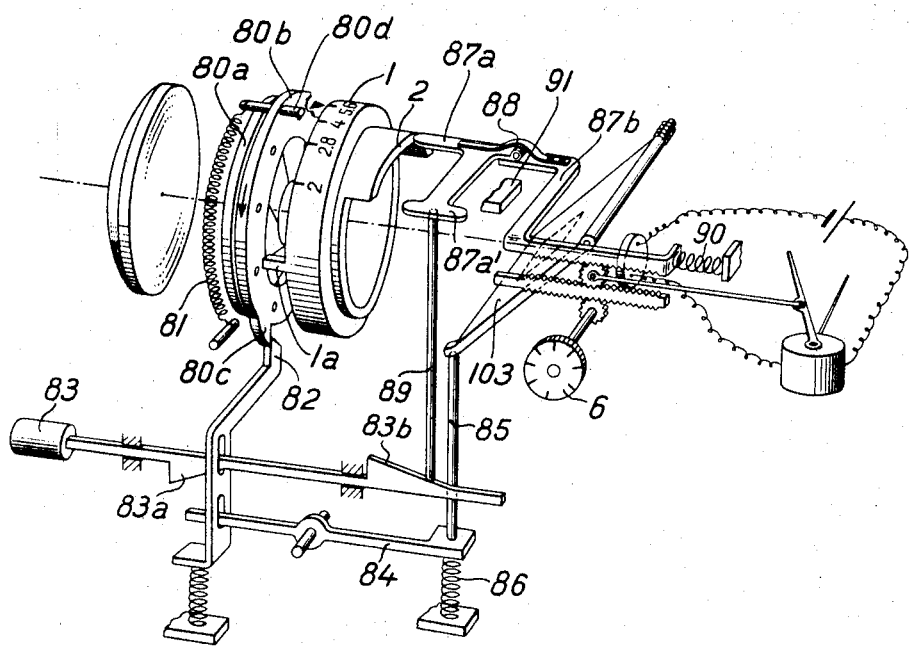
FIGURE 8 illustrates another embodiment of the invention with regard to the cooperation of correcting device in accordance with the principal aspects of the invention and the depth-of-field control.

The control operation with the aid of which the button 20 controls this opening and closing of the diaphragm is known per se and it is not shown in FIGURE 1. A conceivable mode of coupling button 20 to a mechanism for coupling and de-coupling selector ring and diaphragm is shown in FIGURE 8.

If a camera is in fact equipped with such a depth-of-field control, this control must also be coupled to the light meter arrangement so that the light meter arrangement is not affected by operation and release of this control button 20. The selector ring with cam introduces into the light meter a corrective value corresponding to the anticipated change in light intensity which will occur when the diaphragm closes to the selected value. That correction is needed only if during changes in position of the diaphragm selector the diaphragm remains fully open. If the selector is coupled to the diaphragm, the correction is not needed. The correction during selection results in a movement of pointer 10 towards pointer 13; when the diaphragm is actually operated, pointer 13 will move towards pointer 10 and the latter must not be moved even if the selection ring is adjusted.

As stated above, lever $3b$ is provided with the pin $3c$ which restricts pivotal rotation of feeler 3 in counter-clockwise direction as far as the view shown in FIGURE 1 is concerned. A leaf spring 18 is mounted on the lever $3b$. The spring 8 is rather strong or stiff and actually arrests the position of feeler 3 so that it abuts the contour of cam 2 and is urged against pin $3c$. Spring 8 is considerably stronger than springs 4 combined, so that upon rotation of ring 1, cam 2 will not pivot feeler 3 clockwise about pivot pin $3d$, but the motion of feeler 3 is transmitted to lever $3b$ via the stiff spring 18 whereby the resiliency of springs 4 can be overcome easily. It is this particular pin and spring arrangement which makes it possible to regard the feelers 3 as being positively coupled to the ratchet portion $3a$ for purposes of cooperation as described earlier. Thus, as long as feeler 3 is operated by cam 2 and as long as lever $3b$ is not acted upon otherwise, clockwise and counterclockwise motions of feeler 3 about pivot point $3d$ are inhibited and elements 3, $3b$ and $3a$ move in fact in unison and in substantially exclusive dependency upon cam 2.

Now we consider the other side of the lever $3b$, having an arm $3e$ which engages one side of a rocking or two-arm lever 22. The other arm of rocking lever 22 is positioned in spaced-apart relationship to the inner end of the button 20. A flange $20a$ on button 20 serves as support for a spring 21 bearing against the arm of lever 22 which faces that inner end of button 20. Spring 21 is rather weak so that it exerts no appreciable pressure on the lever 22 for transmission to lever $3b$. The rocking lever 22 serves for direction reversal of the control motion of button 20 in relation to the desired effect of such motion on lever $3b$.

The inner extension of the control button 20 has a distance from lever 22 in the normal position of the unactuated depth-of-field control button which is in excess of any pivot motion lever 22 may undergo over the entire range of positioning of lever $3b$ by rotating ring 1 with cam 2. Maximum distance is established when the diaphragm selector ring has a position to select the highest opening of the diaphragm of any objective lens 1. On the other hand, the stroke of button 20 must be such that in its depressed position, it should just engage the lever 22, without causing any pivot motion of lever 22. It will be recalled that lever $3b$ is in abutment with stop 17, as illustrated, which position presently has still resulted from a direct selection of the highest aperture of the lens.

On the other hand, if the diaphragm selector ring 1 was adjusted to a different aperture stop value prior to pressing button 20, then the feeler 3 has moved the lever $3b$, in the drawing of FIGURE 1 in a down direction, thereby causing springs 4 to be compressed and of course causing also lever $3b$ to disengage from the stop 17. This down movement was transmitted via arm $3e$ to lever 22 and the rocking lever 22 thus was pivoted in counter-clockwise direction; the distance between the other end of the lever 22 and the inner end of button 20 was diminished.

If now the button 20 is pressed again, then before reaching the fully depressed position, the inner end face of button 20 will abut lever 22 and upon continued depressing the button 20 the lever 22 will be pivoted in clockwise direction. This clockwise motion of lever 22 is transmitted to lever arm $3e$ which is shifted in up direction. The spring 18 continues to urge the upper nose of feeler 3 into engagement with the control curve 2 but the pin $3c$ disengages from the feeler 3 until the lever $3b$ again abuts stop 17. In order to do this, the operator must exert sufficient pressure on button 20 to compress spring 18. In the downmost position of button 20 lever 3b together with the ratchet 3a is now shifted into the same position which corresponds to a selection of a fully open diaphragm aperture.

Previously the lever system 3, 3b, 3a, etc., established a light meter correction for the selected (closed down) aperture, while the diaphragm was still completely open. Upon pressing the depth-of-field control button 20 the diaphragm closes actually to the preselected value, therefore the previously established correction has to be overridden, and this is done by causing this rocking lever 22 to shift the lever 3b back into abutment with the stop 17. Thus one can say that upon actuating or pressing the depth-of-field control button 20 the entire correction system is temporarily removed from the system or is overridden and remains so removed as long as the control button 20 remains depressed.

For the light meter and its pointer, the effect is this: Assuming prior to operation of the control button 20, the selector ring 1 was actuated to cause pointer 10 to register with pointer 13. When button 20 is pressed, pointer 10 is shifted back for as many angle steps as the previously selected diaphragm differs from the maximum aperture. On the other hand, the diaphragm is now actually closed down to the selected value and thus pointer 13 is shifted by a like number of angle steps: The previously established alignment of pointers 10 and 13 is thus maintained, but the positions of both have changed. If subsequently for depth-of-field adjustment the selector ring 1 is actuated, while coupled to the diaphragm, then the alignment of pointers 10 and 13 is disturbed again but may, for example, be reestablished by adjusting the exposure time.

As shown particularly in FIGURE 7 the depth-of-field control button 20 can be arrested in the depressed position in that upon being depressed a latch 23 drops into a notch 28 under the influence of a spring 24 and prevents the control button 20 from returning into the unactuated position even though the user has removed his finger from the button. This is of advantage as now the user is free to use his hand in any other way, for example, for changing the setting of the diaphragm selector ring which in this case now is coupled with the diaphragm itself.

The locking of the depth-of-field control button 20 can be released in two ways. For example, there may be provided an additional control button 26 which when pressed actuates the latch 23 in order to pull the latch 23 out of the circular notch 28. As latch 23 recedes from notch 28 springs 18 and 21 push the depth-of-field control button 20 out. The second way of releasing the depth-of-field control button is by actually triggering the camera. Upon triggering the shutter release control button 29 a curved control rod 30 is actuated thereby to pivot the latch 23 out of engagement with the notch 28. This may actually precede the actual shutter opening. Actually, only one of the two unlatching devices are needed in the camera.

The embodiment shown in FIGURE 8 shows a different type of cooperative relationship between feeler arm and a depth-of-field control button. There is shown somewhat schematically a portion of an objective lens. The diaphragm is shown here in some greater detail. There is a stationary support ring 80a and an adjustable, i.e., rotatable ring 80b for actuation of the diaphragm laminates. When a control arm 82 is in the illustrated position it locks a nose 80C of ring 80b in a position so that the diaphragm is open. The particular diaphragm selector ring 1 is freely rotatable about the optical axis of the system and has a nose or stop 1a cooperating with a stop 80d which projects axially from the ring 80b. An extension of this stop 80d can be used for anchoring one end of a spring 81 which is fastened stationarily with its other end to the housing of the camera. Spring 81 thus tends to close the diaphragm down to the smallest permitted aperture of the system, but is prevented from doing so by the end of arm 82 when latching behind nose 80c.

Whenever the arm 82 is pulled down, the nose 80c is released and the spring 81 rotates the ring 80b until the stop 80d abuts the stop 1a. Thereby the diaphragm is closed to an f-stop value as preselected by the selector ring 1. Adjustment of the ring 1 has as its primary and immediate function the proper placement of the stop 1a against which upon release the stop 80 can abut to arrest the position of the ring 80b and to thereby adjust the diaphragm to a particular value.

The function of control arm 82 can be considered from two points of view. When in the illustrated position, it does or permits position locking of the diaphragm for largest aperture opening. When releasing nose 80c, the diaphragm is pulled by spring 81 into coupling position with the selector ring 1 wherein stop 80d engages stop 1a. This occurs either when a picture is being taken, or when the user wants to adjust the diaphragm directly by manipulating the selector ring 1.

As the camera is released by operating the shutter release button, the mirror 103 is pivoted up in a known manner. An actuation rod 85, mounted to extend upward from one side of a double arm lever 84, keeps the latter lever in the illustrated position as long as mirror 103 is in the down, i.e., 45° inclined position. When the mirror 103 pivots up, a spring 86 will pivot the lever 84 in counterclockwise direction thereby pulling the arm 82 down which in turn releases the ring 80b and the diaphragm can close down to the previously selected position (or stay in the position if the largest aperture opening had been selected). Arm 82 will stay down until the mirror 103 is pivoted down again. As arm 83 moves up and back into the latching position, the position of the diaphragm adjusting ring 80b is not automatically arrested, but by operation of the selector ring 1 the ring 80b must be rotated to the largest opening position, and the nose 80c locks behind arm 82 thereafter.

Of present importance is that there is a second mode of operating the arm 82. The camera is equipped with a button 27 which can be called again the depth-of-field control button operating an elongated bar which is provided with two sawtooth type cams 83a and 83b. If the button 83 is pressed, in the drawing to the right, the cam 83a will cause the arm 82 to be pulled down, and again the end of arm 82 releases the stop 80c; the diaphragm adjusting ring 80b is again coupled to selector ring 1 in the particular position of the latter, and for all subsequent positions as long as the coupling relationship is maintained.

It follows that by operation, i.e., by pressing of the control button 83 the diaphragm and the diaphragm selector ring 1 are coupled without concurring camera shutter release; by adjusting the ring 1 one can directly adjust the diaphragm, which overrides the preview feature and permits selection of the desired depth of field. One can see that control arm 82 has two elongated slots traversed respectively by the control rod 83 and by the left arm of lever 84, so that the latter two elements can control the arm 82 independently.

The second control function of the depth-of-field control button 83 is controlled by the cam 83b. As button 83 is pushed the contour surface of the cam 83b pushes a rod 89 in upward direction. The upper end of the rod 31 rests against the under surface of a T-arm 87c which pertains to the cam follower cooperating with the cam 2. The cam follower is comprised of two parts, 87a and 87b. Part 87a is pivotally mounted on part 87b but is retained in the illustrated position by a leaf spring 88. In this position the tip of part 87a is in engagement with the contour of cam 2, so that the light meter indicator-reference pointer relation can be controlled in response to the diaphragm selection as aforedescribed.

If the rod 89 is pushed in upward direction by operation of cam 83b, then the part 87a pivots up and its tip disengages from the contour of the control cam 2 of selector ring 1, so that the cam ceases to determine the position of cam follower 87a–87b. A spring 90, corresponding to one of the springs 4 in FIGURES 1 and 2, will now push the cam follower assembly 87a, 87b forward until the traverse section of part 87b abuts a stop 91 which corresponds to the stop 17 in FIGURES 1 and 2. It followed, that the cam follower 87a–87b is now positioned in the terminal position corresponding to a cam-curvature control value associated with the largest aperture selection.

Thus, upon pressing the depth-of-field control button 83, the diaphragm adjusting ring 80b is coupled to the selector ring 1 for actuation therewith. The feeler 87a–87b is positioned for maximum diaphragm opening, thus placing pointer 10 under exclusive control of the exposure time adjusting knob 6. It follows, that the alignment of pointers 10 and 13 will now be controlled by direct diaphragm adjustment resulting from the coupled relationship of selector ring 1 with the diaphragm control ring 88b directly influencing the light intensity.

As the depth-of-field control button 83 is released, i.e., pulled out, the spring 88 tends to force the feeler end 87a of this cam follower arrangement back into engagement with the contour of cam 2. However, in order to make this possible it is necessary to first return the selector ring 1 to the largest f-stop selection position so that in fact the tip of part 87a can reengage the contour of cam 2. At the same time the ring 80b is pivoted into position so that nose 80c can again lock against the end of arm 82. It should be noted, however, that neither button 83 needs to be released or pulled out, nor do the elements 80b and 1 have to be de-coupled prior to taking the picture.

In the principal embodiments of the present invention, extensive use was made of levers and linear transmission of motions and positions. One can readily see that other types of transmissions, including gears, can be used to ultimately position pointers 10 and 13. Moreover, the entire system is linearized in that each adjusting step corresponding to a halving or doubling of the light intensity, actual or selected, produces the same deflection angle of pointers 10 and 13 anywhere in their deflection ranges. This is convenient but not essential. Moreover, the invention was explained in that between f-stop scale values of the selector ring and deflection pointer 10 there is substantially a linear relationship, obtained in that each of the several transmission steps in between are linearized. This is likewise not essential as one may readily cause compensation of a non-linear transmission by another non-linear transmission to produce an overall linear relationship.

The invention is not limited to the embodiments described above but all changes and modifications thereof not constituting departures from the spirit and scope of the invention are intended to be covered by the following claims.

What is claimed is:

1. In a single lens reflex camera system having a camera housing, and a plurality of exchangeable lenses of differing maximum aperture, the camera housing having a light meter including a light sensitive element positioned in the imaging ray path of any of the lenses when mounted to the housing, each lens having a lens mount which includes a diaphragm and a diaphragm selector ring for selecting a diaphragm opening over a range from a largest to a smallest opening, divisible in steps, with sequential selecting steps each effective for selectively halving or doubling of the light intensity, the selected diaphragm opening becoming the actual aperture when the diaphragm is closed down to the selected aperture value, the combination comprising:

indicating means included in the light meter to provide an indication of the light intensity permitted to reach said element through one of the lenses when mounted to the camera housing;

reference means for the indicating means; and control means for providing a variation in the relation between the reference means and the indicating means including a cam follower arrangement having feeler means for controlling said relation, further including a cam on the selector ring of the lens mounted to the camera and having a contour similar for the several selector rings, but having a different position relative to the diaphragm aperture values as selectable by the several selector rings, the contour providing a particular position of the feeler for the largest diaphragm aperture selectable for the lens mounted to the camera independently from the value thereof and providing positions for the feeler varying linearly for diaphragm aperture selections smaller than the largest value.

2. The combination as set forth in claim 1 and including means for locking said feeler into said particular position upon disengagement of the contour from the feeler.

3. The combination as set forth in claim 1 and including first additional means for selectively coupling the diaphragm to the selector means for concurrent manual adjustment, and including second additional means for placing said feeler into said particular position independently from the position of said cam when the diaphragm is coupled to the selector means.

4. A combination as set forth in claim 1 including first additional means for selectively coupling the diaphragm to the selector means for concurrent adjustment, and including second additional means cooperatively coupled to the first additional means for operating the control means to override the control exerted by the cam-follower arrangement and to establish a relation corresponding to the particular position of the feeler independently from the position of the cam.

5. In a single lens reflex camera with preview feature having a body to which one of a plurality of objective lenses can be attached, the objective lenses each being mounted, the mount of a lens having a diaphragm for aperture adjustment between a highest and a lowest value, the highest value differing for the several lenses, each lens further having a diaphragm selector means for diaphragm preselection along an f-stop scale with neighboring f-stops representing halving or doubling of the light intensity permitted to pass into the camera through the diaphragm of the lens mounted to the camera, there being a photosensitive element to be responsive to the light permitted to enter the camera through the lens mounted thereto, the combination comprising:

first means coupled to said photosensitive element for providing an indication of the light intensity entering the camera through the aperture of the diaphragm;

second means for providing a reference for said indication;

third means for changing the relation between said indication and said reference in dependence upon the position of the diaphragm selector means, the third means including means for providing a variation in said relation in linear dependency upon the diaphragm aperture selection for a range from the smallest aperture to about one f-stop down from the largest aperture selection, the rate of the variation being similar for the several lenses, and providing a fixed relation for the largest aperture selection independently from the value thereof, the variation for the selecting range between the largest and about one f-stop down therefrom being at most equal to the resulting variation as between neighboring f-stops of selector adjustment in said linear range.

6. In a single lens reflex camera having a photosensitive element positioned in the imaging light path for the camera, the camera further having means for receiving an objective lens selected from a plurality, each lens in the plurality being mounted and the mount has a diaphragm for aperture adjustmnt with a maximum aperture differing for the several lenses of the plurality, the mount for each lens further having diaphragm aperture selector means for selecting the diaphragm aperture to be used and in conventional *f*-stop steps, ranging from substantially a maximum aperture down to a smallest aperture, each *f*-stop step down corresponding to substantially halving the intensity of the light permitted to enter the camera through the lens and the diaphragm, the combination comprising:

first means coupled to said photosensitive element and including an indicator for providing an indication of the light intensity entering the camera through the aperture of the diaphragm;

second means for providing a reference for said indication; and third means coupled to the diaphragm selecting means for controlling the position relation between the indication as provided by the first means and the reference as provided by the second means by providing a control value in dependence upon the diaphragm selection by the selecting means, the third means providing a first control value for the largest diaphram aperture selection of the objective lens mounted to the camera independently from the actual value of that largest diaphragm aperture, and providing a plurality of second control values progressively changing from the first control value by substantially similar increments for each diaphragm aperture selection steps, over a range of aperture selections smaller than the maximum aperture.

7. The combination as set forth in claim 6, the third means including:

a cam-follower arrangement including a follower feeler for controlling said position relation, and including a cam having a contour, the cam being particularly associated with a selector means from the plurality, the contour being a portion of a contour common to all selector means and having relative positions to the several selector means so that the feeler positions as determined by the contour as particularly associated to the selector means of the plurality for different lenses and for similar diaphragm aperture selections, differ, so that the respectively resulting position relations differ by the same amount for which the indicator positions differ under similar illuminating conditions for the two maximum apertures of any two of said lenses.

8. In a single lens reflex camera system having a camera housing, and a plurality of exchangeable lenses of differing maximum aperture, the camera housing having a light meter including a light sensitive element positioned in the imaging ray path of any of the lenses when mounted to the housing, each lens having a lens mount which includes a diaphragm and a diaphragm selector ring for selecting a diaphragm opening over a range from a largest to a smallest opening, divisible in steps, with sequential selecting steps each effective for selectively halving or doubling of the light intensity, the selected diaphragm opening becoming the actual aperture when the diaphragm is closed down to the selected aperture value, the combination comprising:

indicating means included in the light meter to provide an indication of the light intensity permitted to reach said element through one of said lenses when mounted to the housing, for similar ambient conditions the indication being dependent solely upon the maximum aperture of the lens from the plurality when mounted to the housing;

reference means for cooperation with the indicating means to provide a visible reference indication;

control means for the reference means including a cam follower arrangement having feeler means for operating the reference means to provide a reference value for the indicating means, further including a cam for positioning said feeler, the cam being one of a plurality of cams respectively mounted to the selector rings of the plurality of lenses, each cam having a contour for providing linear feeler position variations for an aperture selection range between the smallest and about one *f*-stop down from the largest *f*-stop selection of the lens, the contours of the several cams in that range being similar, the contours differ in their relative association with the several diaphragm aperture selections, so that cams respectively cooperating with the feeler provide different feeler positions for the same diaphragm aperture selections when the cams pertain to lenses of different maximum aperture, the cams all providing a fixed feeler position for the largest aperture when selected by the selector ring independently from the value thereof, a cam providing a feeler position variation between the largest aperture and about one *f*-stop down therefrom, equal to the difference between a change of feeler position provided along the linear cam contour as between neigboring *f*-stops within said range, and the reduction of the effective aperture from the theoretical maximum value due to vignetting.

9. In combination with a single lens reflex camera with a preview feature to provide an indication of the effect of diaphragm closing when an aperture selector ring is adjusted without actually changing the aperture, the selector ring being one of a plurality, respectively pertaining to an objective lens from a plurality of lenses having differing maximum apertures:

a feeler mounted to the camera for having variable positions;

a transmission means interconnecting the feeler with the indicator for said indicator to provide an indication of the position of said feeler; and a plurality of cams respectively coupled to a selector ring of the plurality, each cam having a contour, a cam of the plurality being positioned for engagement with the feeler, the contour having characteristics of providing a first particular position of the feeler for the highest diaphragm aperture of the objective lens independently from the value of the highest value thereof, and providing a plurality of second positions of said feeler, said second positions being, first, dependent upon the relative aperture closing selection by the selector ring down from the highest aperture independently from the value thereof, and, second, each second position being additionally dependent upon a particular corrective value in dependence upon vignetting of the lens.

10. In a single lens reflex camera system having a camera housing, and a plurality of exchangeable lenses of differing maximum aperture, the camera housing having a light meter including a light sensitive element positioned in the imaging ray path of any of the lenses when mounted to the housing, each lens having a lens mount which includes a diaphragm and a diaphragm selector ring for selecting a diaphragm opening over a range from a largest to a smallest opening, divisible in steps, with sequential selecting steps each effective for selecting halving or doubling of the light intensity, the selected diaphragm opening becoming the actual aperture when the diaphragm is closed down to the selected aperture value, the combination comprising:

indicating means included in the light meter to provide an indication of the light intensity permitted to reach said element through one of said lenses when mounted to the housing;

reference means for cooperation with the indicating means to provide a visible reference indication;

control means for the reference means including a cam follower arrangement having feeler means for operating the reference means to provide a reference value for the indicating means, further including a cam for positioning said feeler, the cam being on the selector ring of the lens mounted to the camera and having a contour for providing linear feeler position variations for an aperture selection range between the smallest and about one $f$-stop down from the largest $f$-stop selection of the lens, the rate of the linear variation being independent from maximum aperture of the lens to which the cam pertains, the cam further providing a fixed feeler position for the largest aperture when selected by the selector ring independently from the value thereof, and providing a feeler position variation between the largest aperture and about one $f$-stop down therefrom, less than a change of feeler position provided along the linear cam contour as between neighboring $f$-stops within said range.

11. In combination in a single lens reflex camera to which exchangeable objective lenses can be attached, such a lens having a diaphragm for aperture adjustment and a diaphragm selector ring;
    a cam having a particular contour coupled to the selector ring for concurrent adjustment;
    a feeler in the camera for engagement with the contour of said cam;
    transmission means having a first operative relationship with said feeler to follow said feeler and including means for providing a positive engagement of said feeler with said contour in said first operative relationship, the transmission means having a second operative relationship with said feeler in which said transmission means retains a particular position independently from the position of the feeler and corresponding to a particular position of said feeler when in said first operative relationship with the transmission means;
    externally accessible control means mounted to said camera and having a first and a second operating position, said control means when in said first position being de-coupled from said transmission means to establish that first operative relationship between said transmission means and said feeler, said control means when in the second position establishing said second operative relationship between said transmission means and said feeler; and
    means for deriving from said transmission means when in either of said relationships with the feeler a visible indication of the actual or selected diaphragm aperture.

12. The combination as set forth in claim 11, said transmission means being a lever having a stop for positioning the feeler in the first operative relationship, there being a spring interposed between the lever and the feeler for urging the feeler into engagement with the contour of the cam, the feeler when in a particular engaging position with a particular portion of the cam placing the lever in a particular position, said control means when in the second position disengages the stop from the feeler for placing the lever of the transmission means in the particular position independently from the position of the feeler.

13. The combination as set forth in claim 11 including locking means for retaining said control means in said second position after manual actuation for changing from the first to the second position.

14. The combination as set forth in claim 13, said camera being provided with conventional exposure triggering means, there being means operatively coupled to the triggering means for unlocking said locking means upon triggering.

15. The combination as set forth in claim 11, said control means comprising a self-locking push buttom, to lock the button in the second position.

References Cited
UNITED STATES PATENTS

| | | | |
|---|---|---|---|
| 3,052,170 | 9/1962 | Böhm et al. | 95—42 |
| 3,314,343 | 4/1967 | Rentschler | 95—10 |
| 3,322,049 | 5/1967 | Fischer | 95—10 |

NORTON ANSHER, *Primary Examiner.*

CHARLES B. FUNK, *Assistant Examiner.*

U.S. Cl. X.R.

95—10